(12) United States Patent
Branscomb

(10) Patent No.: US 11,677,727 B2
(45) Date of Patent: Jun. 13, 2023

(54) LOW-LATENCY MACSEC AUTHENTICATION

(71) Applicant: Microchip Technology Incorporated, Chandler, AZ (US)

(72) Inventor: Brian Branscomb, Hopkinton, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 35 days.

(21) Appl. No.: 17/193,172

(22) Filed: Mar. 5, 2021

(65) Prior Publication Data

US 2021/0288945 A1 Sep. 16, 2021

Related U.S. Application Data

(60) Provisional application No. 62/990,003, filed on Mar. 16, 2020.

(51) Int. Cl.
| | | |
|---|---|---|
| *H04L 29/06* | (2006.01) | |
| *H04L 9/40* | (2022.01) | |
| *H04L 45/00* | (2022.01) | |

(52) U.S. Cl.
CPC ........ *H04L 63/0435* (2013.01); *H04L 45/566* (2013.01); *H04L 63/0245* (2013.01); *H04L 63/166* (2013.01); *H04L 63/20* (2013.01)

(58) Field of Classification Search
CPC ............... H04L 63/0435; H04L 45/566; H04L 63/0245; H04L 63/166; H04L 63/20; H04L 63/126; H04L 63/162; H04L 63/123; H04L 63/0428; H04L 12/40182
See application file for complete search history.

(56) References Cited

U.S. PATENT DOCUMENTS

| | | | | |
|---|---|---|---|---|
| 6,725,371 | B1 | 4/2004 | Verhoom, III et al. | ........ 713/161 |
| 7,818,563 | B1 | 10/2010 | Dwork et al. | ................ 713/151 |
| 10,826,876 | B1 * | 11/2020 | Sinn | ....................... H04L 63/162 |
| 2008/0130894 | A1 | 6/2008 | Qj et al. | ........................ 380/277 |
| 2010/0312910 | A1 * | 12/2010 | Lin | ..................... H04L 63/0236 |
| | | | | 709/238 |
| 2016/0373443 | A1 * | 12/2016 | Namiki | ................. H04L 63/126 |
| 2018/0241728 | A1 * | 8/2018 | Burgess | ................ H04L 63/166 |
| 2020/0244464 | A1 * | 7/2020 | McLean | ................ H04L 9/0838 |
| 2022/0174049 | A1 * | 6/2022 | Takahashi | ........... H04L 63/0428 |

OTHER PUBLICATIONS

International Search Report and Written Opinion, Application No. PCT/US2021/022065, 13 pages, dated Jun. 10, 2021.

* cited by examiner

*Primary Examiner* — John B King
(74) *Attorney, Agent, or Firm* — Slayden Grubert Beard PLLC

(57) ABSTRACT

An apparatus may include a pipeline circuit configured to process packets and an authentication engine configured to authenticate packets and to provide an authentication signal to the pipeline circuit based on whether packets have been authenticated. The apparatus may further include a control circuit configured to route a given incoming packet to both the authentication engine and to a bypass path. The bypass path may be configured to provide a copy of the given incoming packet to the pipeline circuit to bypass the authentication engine.

17 Claims, 4 Drawing Sheets

LOW-LATENCY MACSEC AUTHENTICATION

PRIORITY

This application claims priority to U.S. Provisional Patent Application No. 62/990,003, filed Mar. 16, 2020, the contents of which are hereby incorporated in their entirety.

TECHNICAL FIELD

The present disclosure relates to electronic networking and communication and, more particularly, to a system and method for low-latency MACsec authentication.

BACKGROUND

IEEE 802.1AE is the IEEE Media Access Control (MAC) Security standard, and is also known as MACsec. MACsec may define data confidentiality and integrity for Layer-2 media access protocols such as Ethernet.

MACsec uses encryption protocols to provide integrity and optional confidentiality in data transmissions. MACsec may offer native security at Layer-2 for higher-layer protocols such as TCP/IP. Data which is to be secured by MACsec is transmitted as a MACsec packet or frame. A MACsec packet may include a header such as an Ethernet header. The MACsec packet header may be followed by a MACsec security tag, if any, which contains information to identify encryption and decryption used, if any. Information may be included to identify a packet number. The MACsec packet may include a payload, which may be encrypted. The MACsec packet may include an Integrity Check Value (ICV) for authentication, which may indicate that the MACsec packet was created by or originated with a node which was in possession of the designated cryptographic key, and that the MACsec payload has not been modified during transmission.

Inventors of the present disclosure have discovered problems in various standards and techniques as MACsec and other specialized, encryption, and authentication standards may replace or add to standard Ethernet implementations. Inventors of the present disclosure have discovered that these may have significant latency. Accordingly, inventors of the present disclosure have developed embodiments to address one or more of these needs that can provide both security and low latency. These embodiments may be applicable to MACsec and other security protocols and applications.

SUMMARY

Figure 1:
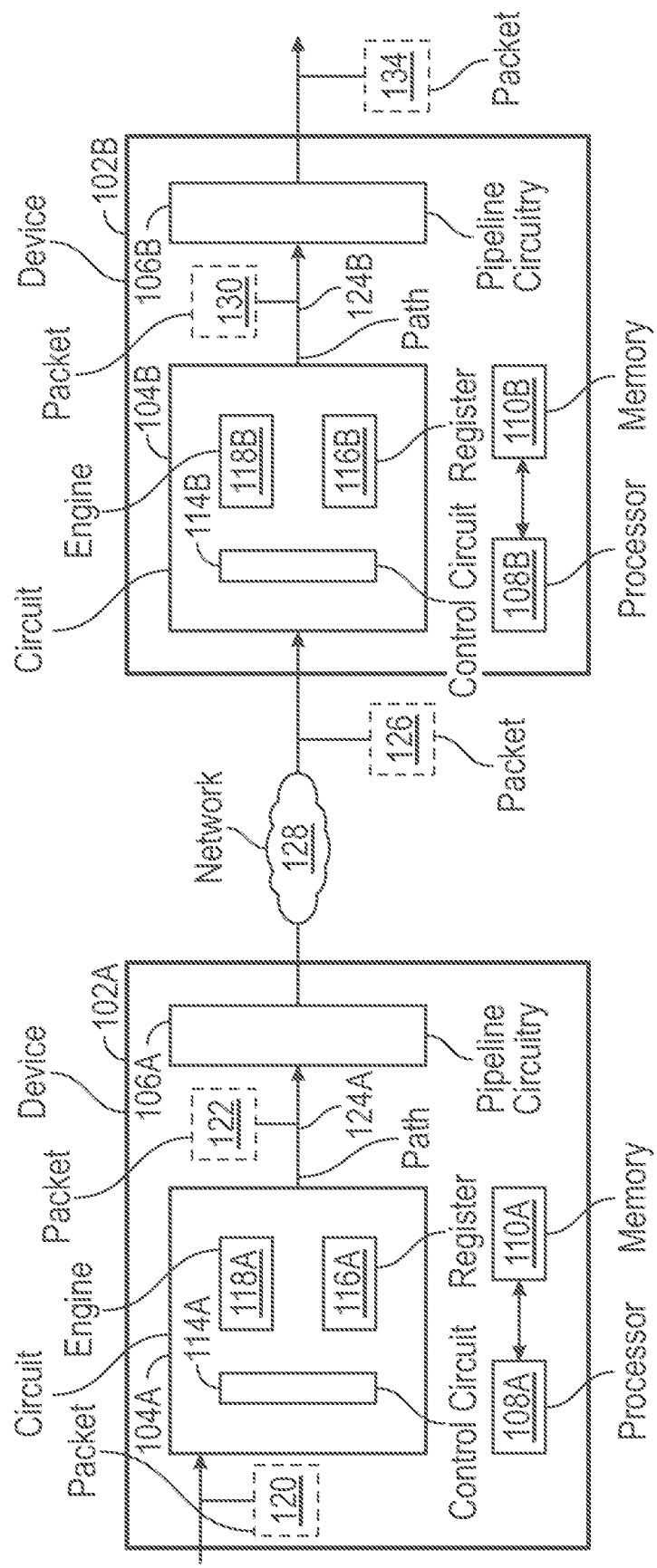
FIG. 1 is an illustration of a system for low-latency MACsec authentication, according to embodiments of the present disclosure.

Embodiments of the present disclosure include an apparatus. The apparatus may include a pipeline circuit configured to process packets and an authentication engine configured to authenticate packets and to provide an authentication signal to the pipeline circuit based on whether packets have been authenticated. The apparatus may further include a control circuit configured to route a given incoming packet to both the authentication engine and to a bypass path. The bypass path may be configured to provide a copy of the given incoming packet to the pipeline circuit to bypass the authentication engine.

Embodiments of the present disclosure may include a method. The method may include receiving a given incoming packet at an apparatus and routing the given incoming packet to both a bypass path and an authentication engine of the apparatus. The method may further include, at the authentication engine, authenticating the given incoming packet and providing an authentication signal to the pipeline circuit based on whether packets have been authenticated. Routing the given incoming packet to the bypass path may include providing a copy of the given incoming packet to the pipeline circuit to bypass the authentication engine.

Embodiments of the present disclosure may include an article of manufacture. The article of manufacture may include instructions on a non-transitory machine-readable medium. The instructions, when read and loaded by a processor, may cause the processor to receive a given incoming packet at an apparatus and route the given incoming packet to both a bypass path and an authentication engine of the apparatus. The instructions may be further to cause the processor to, at the authentication engine, authenticate the given incoming packet and provide an authentication signal to the pipeline circuit based on whether packets have been authenticated. Routing the given incoming packet to the bypass path may include providing a copy of the given incoming packet to the pipeline circuit to bypass the authentication engine.

DETAILED DESCRIPTION

Embodiments of the present disclosure may include transmission techniques using MACsec, but may be applicable to other data security protocols.

Use of MACsec may increase packet transmission and processing latency. MACsec is based on Ethernet, and thus overall throughput may be extremely high. However, latency in the form of a time delay between the initial request to send or receive information and the actual transmission of that information may increase due to MACsec. The latency may be a round-trip latency, meaning that the same or similar latencies are experienced by both a sender and a receiver of a MACsec connection. The total amount of latency in a single direction of transmission may include the sum of latencies arising from internal delays such as Ethernet MAC and PHY functions, cable delays that may be a function of cable length and materials therein, internal routing, switching, and queuing delays such as delays of input and output of frame memory, and MACsec-specific latencies. The MACsec-specific latencies may include latencies that arise from MACsec functions such as encryptions, decryptions, and authentications of transmission.

Embodiments of the present disclosure may include an apparatus. The apparatus may include a pipeline circuit configured to process packets. The packets may be of any suitable network traffic structure, such as MACsec packets.

The packets may be intermediate packets that are otherwise processed by the apparatus. The apparatus may include an authentication engine configured to authenticate packets and to provide an authentication signal to the pipeline circuit based on whether packets have been authenticated. The authentication signal may be any suitable signal, such as a packet, single bit, or other information, to indicate a result of authentication. The apparatus may include a control circuit configured to route a given incoming packet to both the authentication engine and to a bypass path. The bypass path may be configured to provide a copy of the given incoming packet to the pipeline circuit to bypass the authentication engine.

In combination with any of the above embodiments, the apparatus may further include an encryption and decryption engine. The authentication engine, encryption and decryption engine, and pipeline circuitry may be implemented in any suitable manner, including analog circuitry, digital circuitry, configurable logic, instructions for execution by a processor that perform the functionality herein, or any suitable combination thereof.

The control circuit may be configured to route incoming packets in any suitable manner. For example, the control circuit may be configured to control demultiplexers, multiplexers, switches, or switch fabric that interconnect the authentication engine, the encryption and decryption engine, and the pipeline circuitry in any suitable manner. Routing of packets in the apparatus may be determined by a mode of operation designated in any suitable manner, such as by user or system preferences or commands and recorded in a register. The control circuit may be configured to read the configuration and apply or cause routing of packets as described herein.

In combination with any of the above embodiments, a first packet may arrive at the apparatus. The control circuit may be configured to route the first packet selectively to the authentication engine, the encryption and decryption engine, and the pipeline circuitry. The first packet may be routed in parallel to the authentication engine and to a subcircuit. The subcircuit may include the encryption and decryption engine in parallel with a bypass path. Output of the subcircuit may be made to the pipeline circuitry. The encryption and decryption engine may be configured to encrypt or decrypt packets and to provide resultant encrypted or decrypted packets to the pipeline circuit. In combination with any of the above embodiments, the control circuit may be further configured to route the given incoming packet selectively to either the bypass path or to the encryption and decryption engine within the subcircuit. Routing the given incoming packet to the bypass path may bypass the operations of the encryption and decryption engine. Thus, a first packet routed through the bypass path may yield a second packet routed to the pipeline circuitry that is unchanged from the first packet. A first packet routed through the encryption and decryption engine may yield a second packet that is a decrypted or encrypted version of the first packet.

In combination with any of the above embodiments, the control circuit may be further configured to selectively route the given incoming packet to the authentication engine and to the bypass path based on a determination that the incoming packets are to be authenticated but are not to be decrypted or encrypted. The given incoming packet might not be routed to the encryption and decryption engine.

In combination with any of the above embodiments, the control circuit may be further configured to selectively route the given incoming packet to the encryption and decryption engine based on a determination that the incoming packets are to be encrypted or decrypted. The given incoming packet might not be routed to the bypass path.

In combination with any of the above embodiments, the control circuit may be further configured to route, in parallel, copies of the given incoming packet to authentication engine and to the pipeline circuit through the bypass path. This may be performed based on a determination that the incoming packets are not to be encrypted or decrypted, but are to be authenticated.

In combination with any of the above embodiments, the pipeline circuit may be further configured to receive the given incoming packet. This may be received through the bypass path. The pipeline circuit may be further configured receive the authentication signal, and, between receipt of the given incoming packet and the authentication signal, process the given incoming packet to generate an output packet.

In combination with any of the above embodiments, the pipeline circuit may be further configured to, based upon an indication in the authentication signal that the given incoming packet failed authentication, take a corrective action. In combination with any of the above embodiments, the pipeline circuit may be further configured to, based upon an indication in the authentication signal that the given incoming packet has been authenticated, issue the output packet.

FIG. 1 is an illustration of a system 100 for low-latency MACsec authentication, according to embodiments of the present disclosure.

System 100 may include one or more devices 102. Devices 102 may be implemented by any suitable electronic device or portion thereof. Devices 102 may include, for example, a communications module of an electronic device, a PHY, a network interface card (NIC), a network switch, a network router, or any portion thereof. Devices 102 may be implemented in any suitable manner, including analog circuitry, digital circuitry, configurable logic, instructions for execution by a processor (such as processor 108) that perform the functionality of devices 102 as described herein, or any combination thereof. Devices 102 may be configured to perform communication based upon MACsec or other suitable protocols. Although two devices 102A, 102B are shown in the example of system 100 in FIG. 1, system 100 may include any suitable number and kind of devices 102.

Devices 102 may be configured to receive or generate network traffic. The network traffic may be to be sent to other electronic devices, such as other instances of device 102. In some cases, the network traffic may be intended to be received at an instance of device 102 as an end target. Network traffic may be divided into, for example, packets. Various packets are shown in the example of FIG. 1 at various stages of transmission, such as packets 120, 122, 126, 130, 134.

Packet 120 may be received at or generated by device 102A. Packet 120 may originate from any suitable source, such as another electronic device (not shown) communicatively coupled to device 102A, or from a source within device 102A such as an application (not shown) executing on a processor 108 using instructions stored on a non-transitory machine-readable medium such as memory 110. Packet 122 may be generated internally within device 102A during processing. After processing in device 102A, packet 126 may be generated.

Devices 102 may be configured to send network traffic on to other electronic devices or to subsystems within or communicatively coupled to devices 102. For example, device 102A may be configured to send network traffic through network 128 to device 102B in the form of packet 126. Network 128 may include any suitable network, including wireless or wired networks. In turn, device 102B may be configured to provide traffic to applications (not shown) running on processor 108B or to send traffic on to yet other electronic devices (not shown). For example, packet 130 may be generated internally within device 102B during processing. After processing in device 102B, packet 134 may be generated.

Packet 126 may be based upon packet 122. In turn, packet 122 may be based upon packet 120 and thus packet 126 may be based upon packet 120. Device 102A may be configured to issue packet 126 based upon the input or generation of packet 120. In one embodiment, packet 126 may include a same payload as packet 120. In another embodiment, packet 126 may include a payload that is the same payload as in packet 120, but encrypted. In yet another embodiment, packet 126 may include a payload that is the same payload as in packet 120, but decrypted. In another embodiment, packet 126 may include additional information beyond what information is included in packet 120. Such additional information may include authentication information, such as an ICV, or additional routing or transmission information. When packet 126 conforms to the MACsec protocol, such a packet may always be configured to be authenticated. However, under the MACsec protocol, the payload of packet 126 may or may not be encrypted.

Similarly, packet 134 may be based upon packet 130. In turn, packet 130 may be based upon packet 126 and thus packet 134 based upon packet 126. Device 102B may be configured to issue packet 134 based upon the input of packet 126. In one embodiment, packet 134 may include a same payload as packet 126. In another embodiment, packet 134 may include a payload that is the same payload as in packet 126, but encrypted. In yet another embodiment, packet 134 may include a payload that is the same payload as in packet 126, but decrypted. In another embodiment, packet 134 may include additional information beyond what information is included in packet 126. Such additional information may include authentication information, such as an ICV, checksum, validation code, or additional routing or transmission information.

Devices 102 may each include a circuit 104. Circuits 104 may be implemented in any suitable manner, including analog circuitry, digital circuitry, configurable logic, instructions for execution by a processor (such as processor 108) that perform the functionality herein, or any combination thereof. Circuits 104 may each include a control circuit 114, one or more registers 116, and an engine 118.

Control circuit 114 may be configured to read settings to determine the operation of circuit 104. Control circuit 114 may be configured to route packets according to such settings and the packet contents such as Ethernet header and security tag contents. Control circuit 114 may be implemented in any suitable manner, including analog circuitry, digital circuitry, configurable logic, instructions for execution by a processor (such as processor 108) that perform the functionality herein, or any combination thereof. Control circuit 114 may include switch logic (not shown) to route input packets, such as packet 120 (for device 102A) or packet 126 (for device 102B). The switch logic may be configured to route intermediate packets under processing by control circuit 114 such as packet 122 (for device 102A) or packet 130 (for device 102B). The switch logic may be configured to route output packets such as packet 126 (for device 102A) or packet 134 (for device 102B). In one embodiment, the switch logic may be configured to selectively bypass routing of packets through respective engines 118 or portions thereof.

Devices 102 may each include an instance of registers 116. Registers 116 may be implemented in any suitable manner, such as a memory location, and may be configured to store any suitable information. For example, registers 116 may include one or more lookup tables or configuration registers.

As discussed above, control circuit 114 may be configured to read settings. Devices 102 may include or may be communicatively coupled to these settings that define operation of devices 102 to produce particular implementations of output packets such as packet 126 (for device 102A) or packet 134 (for device 102B) based upon input packets such as packet 120 (for device 102A) or packet 126 (for device 102B). Such settings may be implemented in any suitable manner, such as by registers 116 in respective devices 102. The settings may be programmed by a user or a maker of devices 102, or may be changed programmatically by other elements (now shown). In some examples, some or all of the settings may be included within packet headers or elsewhere in packets.

Devices 102 may each include an instance of engine 118. Engine 118 may be configured as an encryption, decryption, or authentication engine, and may be implemented in any suitable manner, including analog circuitry, digital circuitry, configurable logic, instructions for execution by a processor (such as processor 108) that perform the functionality herein, or any combination thereof. Engine 118 may be configured to selectively apply encryption, decryption, or authentication of input packets.

Devices 102 may each include additional pipeline circuitry 106. Pipeline circuitry 106 may be implemented in any suitable manner, including analog circuitry, digital circuitry, configurable logic, instructions for execution by a processor (such as processor 108) that perform the functionality herein, or any combination thereof. Pipeline circuitry 106 may be configured to perform additional processing on packets for various functionalities, protocols, or application-specific purposes, such as timestamping, other non-MACsec application processing, or other MACsec processing.

Control circuit 114A may be configured to receive packet 120. In one embodiment, based upon settings in registers 116A to encrypt, decrypt, or authenticate contents of packets during transmission in system 100, control circuit 114A may be configured to route packet 120 to engine 118A.

In another embodiment, if the settings indicate that the contents of packets are not to be encrypted, decrypted, or authenticated, control circuit 114A may be configured to bypass routing of packet 120 to engine 118A or portions thereof, or to instruct engine 118A to bypass such operations.

In yet another embodiment, if the settings indicate that the contents of packets are not to be encrypted or decrypted, but are to be authenticated, control circuit 114A may be configured to route packet 120 to engine 118A for processing. Control circuit 114A may be configured to route a copy of packet 120 to pipeline circuitry 106A while bypassing a portion of engine 118A for encryption and decryption. Furthermore, control circuit 114A may be configured to cause another copy of packet 120 to be sent to a portion of engine 118A for authentication.

Engine 118A may be configured to encrypt or decrypt the payload of packet 120. The resulting encrypted or decrypted payload may be included in packet 122. Engine 118A may be configured to provide packet 122 to pipeline circuitry 106A to perform additional processing on packet 122, such as timestamping, other non-MACsec application processing, or other MACsec processing.

Engine 118A may be configured to perform an authentication of packet 120. Such an authentication may include checking an ICV value included in packet 120 created by an entity that sent packet 120 to device 102A. In one embodiment, engine 118A may be configured to selectively perform the authentication in addition to an enabled encryption or decryption function to be performed by engine 118A. In such an embodiment, engine 118A may be configured to provide the results of the authentication information in packet 122 in a location after the encrypted/decrypted payload in packet 122 to pipeline circuitry 106A. In another embodiment, engine 118A may be configured to selectively perform the authentication in the absence of or separately from an enabled encryption or decryption function to be performed by engine 118A. In such an embodiment, engine 118A may be configured to provide the results of the authentication information in packet 122. In various embodiments, engine 118A may be configured to provide results of the authentication by any suitable signal or information to pipeline circuitry 106A. Engine 118A may provide packets or other information to pipeline circuitry 106A over path 124A. Path 124A may be implemented in any suitable manner for communicating information between engine 118A and pipeline circuitry 106A, such as shared memory locations or another suitable signal.

Pipeline circuitry 106A may be configured to receive packet 122 and any information provided on path 124A. Pipeline circuitry 106A may be configured to perform various tasks for preparing packet 122 to be sent to other devices using the MACsec protocol, such as timestamping or other MACsec or non-MACsec application processing. In one embodiment, pipeline circuitry 106A may be configured to determine whether information received on path 124A indicates that packet 120 passed an authentication evaluation performed by engine 118A. If packet 120 has passed authentication evaluation by engine 118A, then pipeline circuitry 106A may continue processing packet 122. Otherwise, if packet 120 failed the authentication evaluation by engine 118A, then pipeline circuitry 106A or device 102A may take any suitable corrective action. For example, device 102A may alert a user, request packet 120 to be resent, or discontinue processing packet 120. In one embodiment, pipeline circuitry 106A may initiate processing of packet 122 while engine 118A is still performing an authentication evaluation on packet 120. Thus, the latency caused by the authentication evaluation may be minimized.

In one embodiment, the authentication evaluation performed by engine 118A might need to be finished before all modifications of packet 122 are finished and the resulting packet 126 sent.

Similarly, device 102B may process packet 126 to yield packet 134, including generating intermediate packet 130. For example, control circuit 114B in device 102B may be configured to receive packet 126. In one embodiment, based upon settings in registers 116B to encrypt, decrypt, or authenticate contents of packets during transmission in system 100, control circuit 114B may be configured to route packet 126 to engine 118B.

In another embodiment, if the settings indicate that the contents of packets are not to be encrypted, decrypted, or authenticated, control circuit 114B may be configured to bypass routing of packet 126 to engine 118B or portions thereof, or to instruct engine 118B to bypass such operations.

In yet another embodiment, if the settings indicate that the contents of packets are not to be encrypted or decrypted, but are to be authenticated, control circuit 114B may be configured to route packet 126 to engine 118B for processing. Control circuit 114B may be configured to route a copy of packet 126 to pipeline circuitry while bypassing a portion of engine 118B for encryption and decryption. Furthermore, control circuit 114B may be configured to cause another copy of packet 126 to be sent to a portion of engine 118B for authentication.

Engine 118B may be configured to encrypt, decrypt, or authenticate the payload of packet 126. The resulting encrypted or decrypted payload may be included in packet 130. Engine 118B may be configured to provide packet 130 to pipeline circuitry 106B to perform additional processing on packet 130, such as timestamping, other non-MACsec application processing, or other MACsec processing.

Engine 118B may be configured to perform an authentication of packet 126. Such an authentication may include checking an ICV value included in packet 126 created by an entity that sent packet 126 to device 102B, whether directly or through device 102A. In one embodiment, engine 118B may be configured to selectively perform the authentication in addition to an enabled encryption or decryption function to be performed by engine 118B. In such an embodiment, engine 118B may be configured to provide the results of the authentication information after the encrypted/decrypted payload in packet 130 to pipeline circuitry 106B. In another embodiment, engine 118B may be configured to selectively perform the authentication in the absence of an enabled encryption or decryption function to be performed by engine 118B. In such an embodiment, engine 118B may be configured to provide the results of the authentication information in a packet or other suitable signal, such as packet 130. Engine 118B may be configured to provide packet 130 to pipeline circuitry 106B over path 124B. Path 124B may be implemented in any suitable manner for communicating information between engine 118B and pipeline circuitry 106B.

In such an embodiment, engine 118B may be configured to provide the results of the authentication information in packet 130. In various embodiments, engine 118B may be configured to provide results of the authentication by any suitable signal or information to pipeline circuitry 106B. Engine 118B may provide packets or other information to pipeline circuitry 106B over path 124B. Path 124B may be implemented in any suitable manner for communicating information between engine 118B and pipeline circuitry 106B, such as shared memory locations or another suitable signal.

Pipeline circuitry 106B may be configured to receive packet 130 and any information provided on path 124B. Pipeline circuitry 106B may be configured to perform various tasks for preparing packet 130 to be sent to other devices using the MACsec protocol, such as timestamping or other non-MACsec application processing. In one embodiment, pipeline circuitry 106B may be configured to determine whether information received on path 124B indicates that packet 126 passed an authentication evaluation performed by engine 118B. If packet 126 has passed authentication evaluation by engine 118B and is authenticated to be the same packet 126 that was originally sent in system 100, then pipeline circuitry 106B may continue processing packet 130. Otherwise, if packet 126 failed the authentication evaluation by engine 118B and is thus not authenticated to be the same packet 126 that was originally sent in system 100, then pipeline circuitry 106B or device 102B may take any suitable corrective action. For example, device 102B may alert a user, request packet 126 to be resent, or discontinue processing packet 126 and discarding it. In one embodiment, pipeline circuitry 106B may initiate processing of packet 130 while engine 118B is still performing an authentication evaluation on packet 120. Thus, the latency caused by the authentication evaluation may be minimized.

In one embodiment, the authentication evaluation might need to be finished before all modifications of packet 130 are finished and the resulting packet 134 is sent.

Settings of registers 116 may define modes of operation for devices 102 as discussed above. The settings may be defined by, for example, software, manufacturers of devices 102, or users of devices 102. The modes of operation may include:

[A]: a mode with encryption/decryption but no authentication of packets transferred between devices 102;

[B]: a mode with encryption/decryption and authentication of packets transferred between devices 102.

[C]: a mode with no encryption/decryption nor authentication of packets transferred between devices 102; and

[D]: a mode with no encryption/decryption but with authentication of packets transferred between devices 102.

Figure 2:
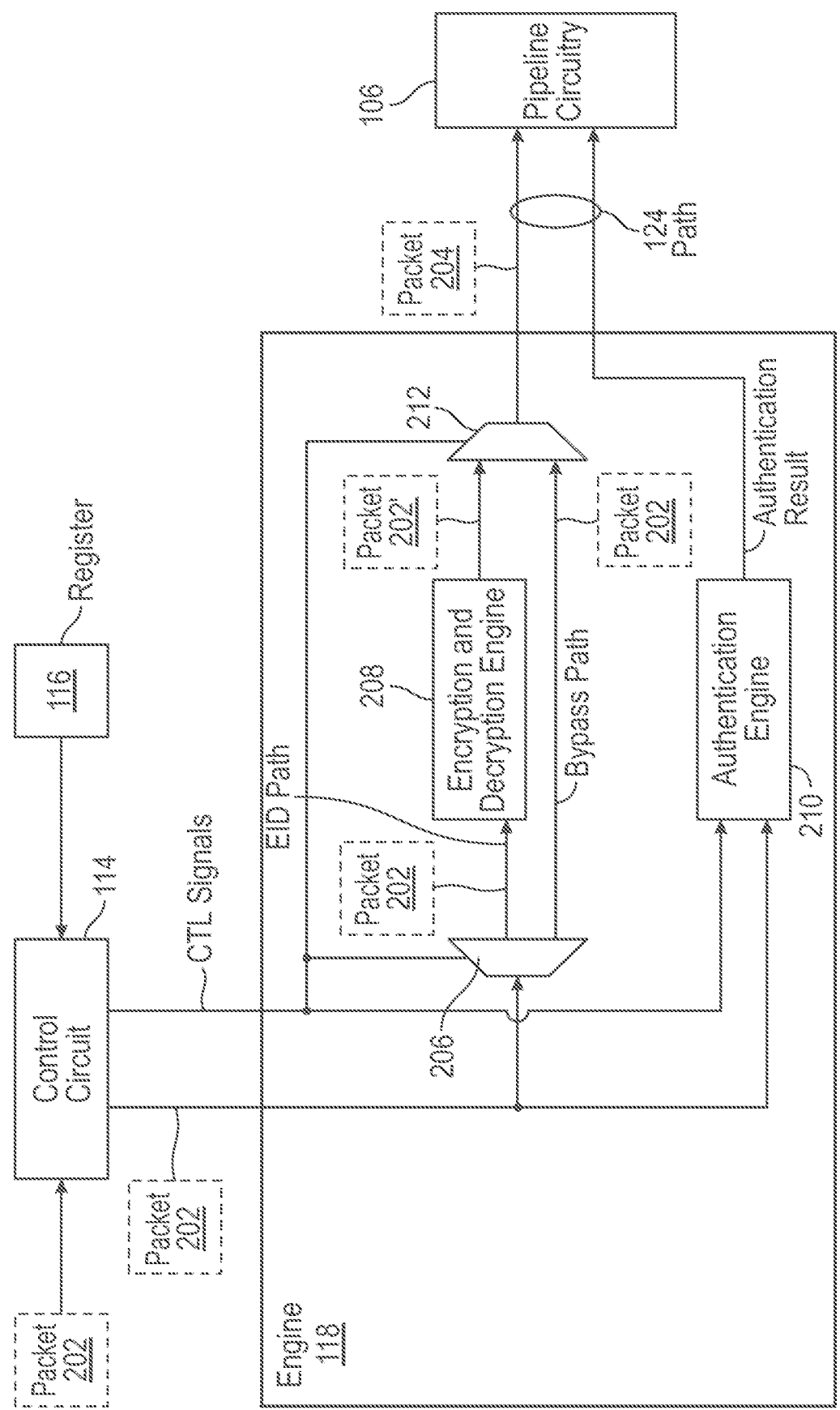
FIG. 2 is a more detailed illustration of an instance of a device for low-latency MACsec authentication, including configuration of the device to operate in modes with encryption/decryption and with or without authentication of packets transferred between devices.
Figure 3:
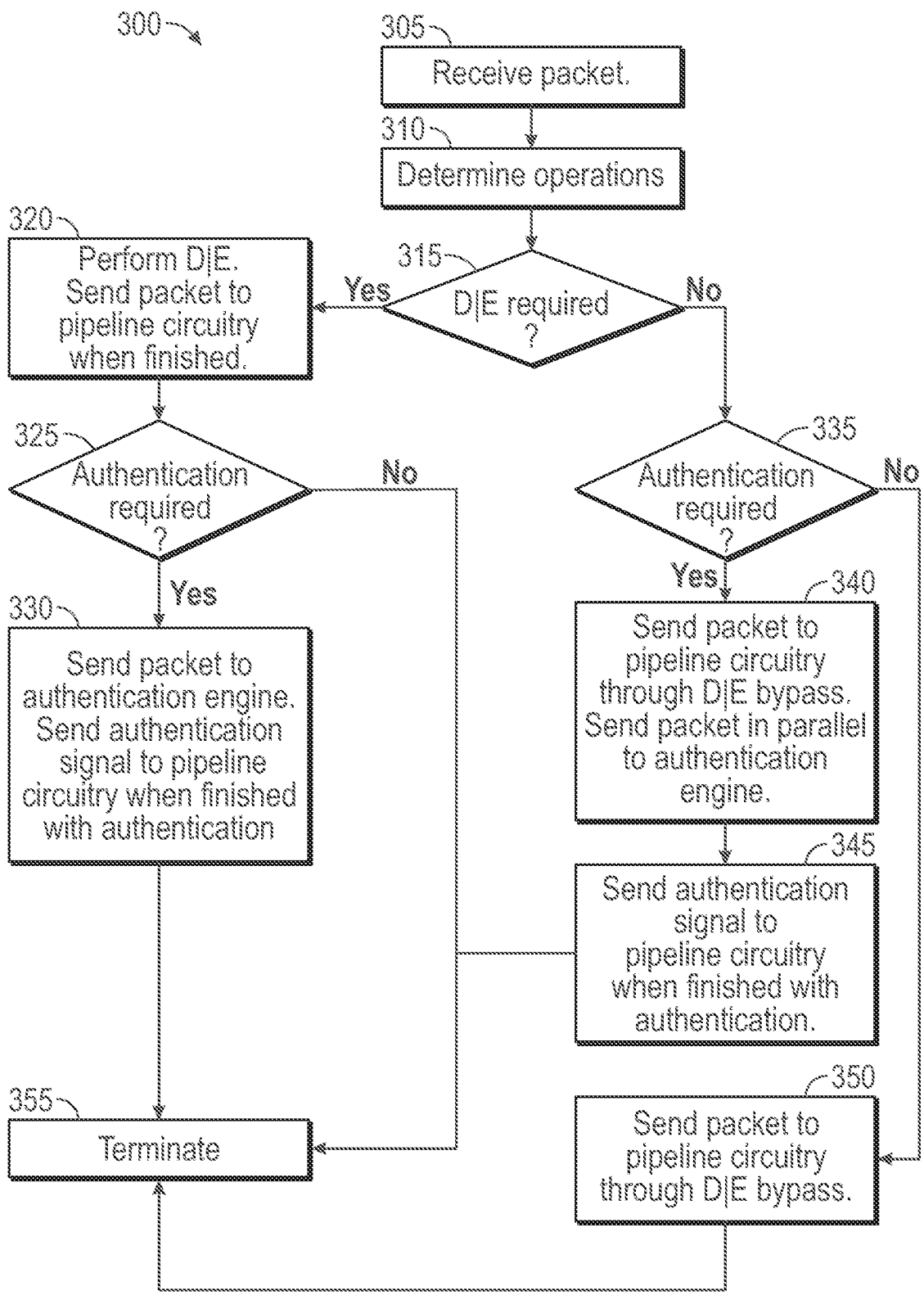
FIG. 3 is an illustration of a method for low-latency MACsec authentication, according to embodiments of the present disclosure.
Figure 4:
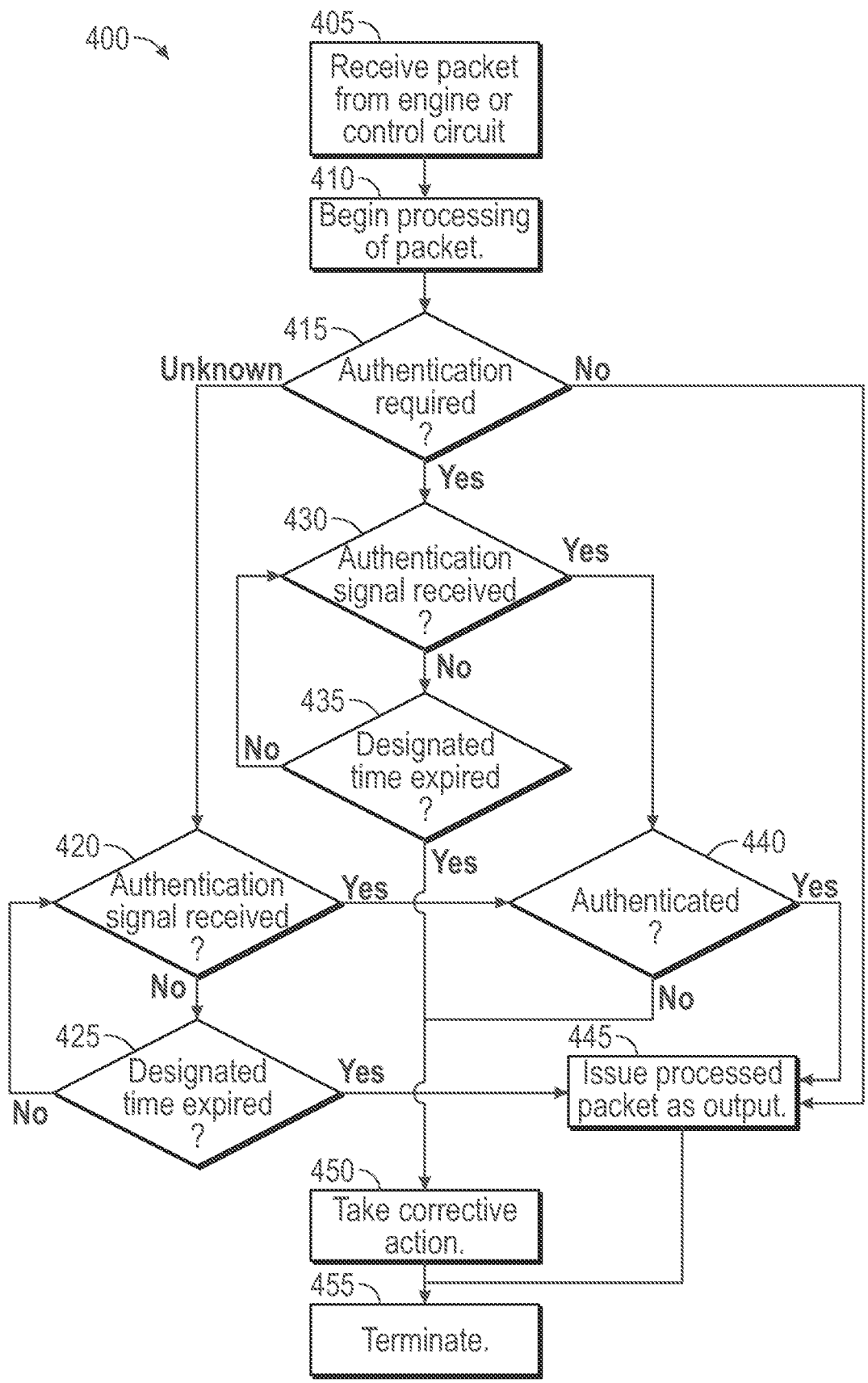
FIG. 4 is an illustration of another method for low-latency MACsec authentication, according to embodiments of the present disclosure.

These modes of operation are shown in FIGS. 2-4. In each of these figures, the operation may be directed by instances of control circuit 114 through any suitable mechanism, such as switch fabric or other routing mechanisms (not shown). Packets may be routed under the control of control circuit 114 to instances of engine 118, from instances of engine 118 to instances of pipeline circuitry 106, or bypassing instances of or portions of engine 118 and being provided directly to instances of pipeline circuitry 106. Furthermore, additional information may be provided as necessary on instances of path 124 to pipeline circuitry 106.

Mode [A] might not conform to the MACsec protocol, but may nonetheless be used for any suitable protocol.

Mode [B] might conform to the MACsec protocol, and may also be used for any other suitable protocol. Mode [B] may represent a commonly used kind of MACsec operation.

Mode [C] might not conform to the MACsec protocol, but may nonetheless be used for any suitable protocol. Moreover, mode [C] might be used by otherwise MACsec-compliant devices, wherein MACsec processing is essentially disabled, or wherein packets are not MACsec secured.

Mode [D] might conform to the MACsec protocol, and may also be used for any other suitable protocol. Embodiments of the present disclosure may reduce latency experienced while operating in this mode, wherein authentication still secures the MACsec payloads of the packets but further processing of the MACsec packet may occur in parallel.

FIG. 2 is a more detailed illustration of an instance of device 102, according to embodiments of the present disclosure.

The example shown may implement any suitable instance of device 102, such as device 102A or device 102B. An input packet 202 may implement packet 120 for an instance of device 102A or packet 126 for an instance of device 102B. A packet used within device 102 as an output of a decryption or encryption engine may include packet 202'. A packet used within device 102 as an output of engine 118 may include packet 204. Packet 204 may implement packet 122 for an instance of device 102A or packet 130 for an instance of device 102B.

Device 102 may be configured to operate in modes wherein packets are transmitted with selective use of encryption. For example, device 102 may receive packet 202 in encrypted form from another device and may be configured to decrypt packet 202. In such an example, device 102 may be configured to encrypt any packets to be sent to other devices as output from pipeline circuitry 106, although this is not illustrated in the figure. Encryption and decryption may be performed by engine 118. Furthermore, encryption and decryption may be selectively performed by engine 118. Any suitable mechanism may be used so that engine 118 may selectively perform encryption and decryption.

For example, engine 118 may include an encryption and decryption engine 208. Although referred to as an encryption and decryption engine 208, encryption and decryption engine 208 may be configured to only encrypt packets, only decrypt packets, decrypt and encrypt packets, or selectively perform any of these tasks. Encryption and decryption engine 208 may be implemented in any suitable manner, including analog circuitry, digital circuitry, configurable logic, instructions for execution by a processor, or any combination thereof. Encryption and decryption engine 208 operation may be controlled by signals (not shown) from control circuit 114, settings stored in memory, or any other suitable source. In the example of FIG. 2, encryption and decryption engine 208 may be configured to perform decryption on any contents received at encryption and decryption engine 208. Accordingly, to selectively perform decryption, engine 118 may be configured to selectively route data to encryption and decryption engine 208. For example, engine 118 may include a demultiplexer 206. Although a demultiplexer 206 is shown, any suitable switch or other mechanism may be used. Demultiplexer 206 may be configured to route incoming data, such as packet 202, selectively to encryption and decryption engine 208 on an encryption or decryption (E|D) path, or to a bypass path that avoids encryption and decryption engine 208. Demultiplexer 206 may be controlled by control signals from control circuit 114. Control circuit 114 may be thus configured to route a given incoming packet selectively to either the bypass path or to encryption and decryption engine 208.

Output of encryption and decryption engine 208 may be a modified packet, denoted as packet 202', that has been decrypted or encrypted, according to the function of encryption and decryption engine 208. The bypass path may provide a copy of packet 202. Engine 118 may be configured to selectively output one of these packets as output. This may be performed in any suitable manner, such as with a multiplexer 212. Multiplexer 212 may be controlled by signals from control circuit 114.

Device 102 may be configured to operate in modes wherein packets are transmitted with selective use of authentication. For example, device 102 may receive packet 202 from another device and may be configured to authenticate the contents or source of packet 202. Authentication may be performed by engine 118. Engine 118 may include any suitable components for performing authentication.

For example, engine 118 may include an authentication engine 210. Authentication engine 210 may be implemented in any suitable manner, including analog circuitry, digital circuitry, configurable logic, instructions for execution by a processor, or any combination thereof. Authentication engine 210 operation may be controlled by signals from control circuit 114, settings stored in memory, or any other suitable source. In the example of FIG. 2, authentication engine 210 may be configured to perform authentication on any contents received at authentication engine 210. In one embodiment, authentication may be selectively performed by authentication engine 210. Authentication engine 210 may selectively perform authentication on the basis of control signals from control circuit 114. In other examples, not shown, engine 118 may selectively perform authentication by routing packet 202 selectively to bypass authentication engine 210. Output of authentication engine 210 may be any suitable signal, such as a packet, single bit, or other information, to indicate a result of authentication. Thus, authentication engine 210 may be configured to authenticate packets received thereto and to provide an authentication signal to the pipeline circuit based on whether packets have been authenticated.

The outputs of engine 208, 210 and the bypass path may be provided to pipeline circuitry 106 in any suitable manner. For example, the output of authentication engine 210 and the output of multiplexer 212 may be both provided on path 124. In another example, not shown, the output of authentication engine 210 and the output of multiplexer 212 may be provided on separate paths. In yet another example, not shown, the output of authentication engine 210 may be routed as an additional input to multiplexer 212 to be selectively provided on path 124.

Packet 202 may be received at device 102, circuit 104, or control circuit 114. Packet 202 may have been generated by another device or within device 102 by, for example, software. Control circuit 114 may access settings in registers 116 or within packet 202 to determine that the mode of operation for device 102 is to include encryption/decryption. Furthermore, control circuit 114 may determine whether the mode of operation for device 102 is to include authentication of packets. Control circuit 114 may issue control signals to engine 118 indicating the mode of operation. These control signals may be provided to, for example, demultiplexer 206, multiplexer 212, and authentication engine 210.

Control circuit 114 may be configured to route packet 202 to engine 118 for selective decryption/encryption and authentication. Engine 118 may be configured to perform decryption on packet 202 and provide the finished packet as packet 204 over path 124 to pipeline circuitry 106. Moreover, if so configured, engine 118 may configured to perform authentication on packet 202 and provide the results in or in addition to packet 204 over path 124 to pipeline circuitry 106. Pipeline circuitry may receive packet 204, perform processing upon packet 204, and issue a resulting packet.

In modes of operation such as modes [A] or [B] as described above, engine 118 may be configured to perform encryption/decryption. In such cases, control circuit 114 may cause packet 202 to be routed by demultiplexer 206 to encryption and decryption engine 208. The bypass path might not be used. Encryption and decryption engine 208 may be configured to generate packet 202'. Packet 202' may be, for example, a decrypted version of packet 202. Packet 202' may be routed to multiplexer 212. Control circuit 114 may cause packet 202' to be routed by multiplexer 212 as packet 204 on path 124 to pipeline circuitry 106. Thus, encryption and decryption engine 208 may be configured to encrypt or decrypt packets (such as packet 202) and to provide resultant encrypted or decrypted packets (such as packet 202') to pipeline circuitry 106. Control circuit 114 may be configured to selectively route a given incoming packet to encryption and decryption engine 208 based on a determination that the incoming packets are to be encrypted or decrypted.

In modes of operation such as mode [A] as described above, engine 118 might not be configured to perform authentication. In such cases, control circuit 114 may disable authentication engine 210. An authentication result might not be sent to pipeline circuitry 106.

In modes of operation such as mode [B] as described above, engine 118 might be configured to perform authentication. In such cases, control circuit 114 may enable authentication engine 210. Packet 202 may be routed to authentication engine 210. Authentication engine 210 may be configured to authenticate the source or contents of packet 202 and return an authentication result. The authentication result might be sent to pipeline circuitry 106.

In modes of operation such as mode [C], as described above, engine 118 might not perform encryption/decryption. In such cases, control circuit 114 may cause packet 202 to be routed by demultiplexer 206 to bypass encryption and decryption engine 208 on the EID path. The bypass path might be used. Packet 202 may be routed to multiplexer 212. Control circuit 114 may cause packet 202 to be routed by multiplexer 212 as packet 204 on path 124 to pipeline circuitry 106. Engine 118 might not be configured to perform authentication. In such cases, control circuit 114 may disable authentication engine 210. An authentication result might not be sent to pipeline circuitry 106.

In modes of operation such as mode [D], as described above, engine 118 might not perform encryption/decryption. In such cases, control circuit 114 may cause packet 202 to be routed by demultiplexer 206 to bypass encryption and decryption engine 208. The bypass path might be used. Packet 202 may be routed to multiplexer 212. Control circuit 114 may cause packet 202 to be routed by multiplexer 212 as packet 204 on path 124 to pipeline circuitry 106. Engine 118 might be configured to perform authentication. In such cases, control circuit 114 may enable authentication engine 210. Packet 202 may be routed to authentication engine 210. Authentication engine 210 may be configured to authenticate the source or contents of packet 202 and return an authentication result. The authentication result might be sent to pipeline circuitry 106. Control circuit 114 may be configured to selectively route a given incoming packet to authentication engine 210 and to the bypass path based on a determination that the incoming packets are to be authenticated but are not to be decrypted. Moreover, control circuit 114 may be configured to route, in parallel, copies of a given incoming packet to authentication engine and to the pipeline circuit through the bypass path.

Furthermore, in modes of operation such as mode [D], based on the determination that decryption or encryption is not to be performed, control circuit 114 may determine that the necessary information may be available for pipeline circuitry 106 to begin processing packet 202. However, packet 202 may still be designated to be authenticated before a resulting packet issues from device 102. This authentication will take a given amount of time, which might otherwise cause a delay before the processing by pipeline circuitry 106 can begin. Accordingly, in one embodiment, based upon a determination that decryption or encryption is not to be performed, and that authentication is to be performed, control circuit 114 may cause routing of a copy of packet 202 that bypasses the encryption and decryption process to be performed by engine 118. This may be performed in any suitable manner, such as by directly routing packet 202 to pipeline circuitry over the bypass path, and selecting the bypass path for routing by multiplexer 212. Control circuit 114 may thus be configured to route a given incoming packet to both authentication engine 210 and to the bypass path, wherein the bypass path is configured to provide a copy of the incoming packet to pipeline circuitry 106 to bypass authentication engine 210.

After receiving packet 202 on path 124 via the bypass path, pipeline circuitry 106 may be configured to being processing its contents. Meanwhile, in parallel, engine 118 may be configured to perform authentication on packet 202 using, for example, authentication engine 210. Based on the results of authentication, authentication engine 210 may provide any suitable signal to pipeline circuitry 106 over path 124 to indicate an authentication result.

Upon receipt of packet 204 or an authentication result, pipeline circuitry 106 may be configured to evaluate whether the signal indicates that the contents of packet 202 were authenticated. If the contents of packet 202 were not authenticated, pipeline circuitry 106 may take any suitable corrective action, such as alerting a user or other element of the system, requesting the packet to be resent, or discontinuing processing of the packet. Pipeline circuitry 106 may thus be configured to receive a given incoming packet (such as packet 204) and receive an authentication signal, and, between receipt of the given incoming packet and the authentication signal, process the given incoming packet to generate an output packet (such as packet 134).

Pipeline circuitry 106 may be configured to withhold sending of its output packet (not shown) until packet 202 has been authenticated or not by engine 118. Pipeline circuitry 106 may be configured to withhold the sending of its output packet upon any suitable basis. In one embodiment, pipeline circuitry 106 may be configured to receive packet 204 and begin processing it immediately, but determine from packet 204 that it has not yet been authenticated, and thus expect a follow-up authentication signal before issuing its output packet (not shown). In such an embodiment, pipeline circuitry 106 may be configured to wait a designated time for the arrival of the authentication signal before either propagating its own output packet (and implicitly assuming that the packet has been authenticated) or taking a corrective action (and implicitly assuming that the packet has not been authenticated). The designated time may be a sufficient time for engine 118 to perform authentication of packet 202. In another embodiment, pipeline circuitry 106 may be configured to receive packet 204 and begin processing it immediately, but without an expectation of whether or not follow-up authentication result should be sent. In such an embodiment, pipeline circuitry 106 may be configured to wait the designated time for arrival of packet 204, and if it is not received, propagate the output packet. Thus, pipeline circuitry 106 may be configured to, based on an indication in an authentication signal that a given incoming packet (such as packet 202, upon which packet 204 is based) failed authentication, take a corrective action. Moreover, pipeline circuitry 106 may be configured to, based on an indication in an authentication signal that a given incoming packet (such as packet 202, upon which packet 204 is based) passed authentication, issue an output packet (such as packet 134) based upon the incoming packet.

In one embodiment, in the example operation of FIG. 2, control circuit 114 might not determine that decryption or encryption are not to be performed, but instead determine that decryption or encryption has already been performed, might not be necessary to be performed, or may be performed in parallel with authentication. In such cases, control circuit 114 may handle processing of packet 202 according to the configurations described above wherein the decryption or encryption are not to be performed.

In various embodiments, engines 208, 210 may be implemented separately or in a combined manner. Moreover, engines 208, 210 might share various resources. For example, engines 208, 210 might be combined into a single engine (not shown). In such a case, the combined engine (not shown) may be placed where encryption and decryption engine 208 is shown in FIG. 2. Packet 202 may be selectively routed to the combined engine on an encryption, decryption, or authentication path (E|D|A) (not shown) where the E|D path is shown in FIG. 2. The combined engine might be controlled by control signals from control circuit 114. In mode [A], control circuit 114 might cause packet 202 to be selectively sent to the combined engine on the E|D|A path but not on the bypass path. In mode [B], control circuit 114 might cause packet 202 to be selectively sent to the combined engine on the E|D|A path but not on the bypass path. In mode [C], control circuit 114 might cause packet 202 to be selectively sent on the bypass path to pipeline circuitry 106 but not to the combined engine on the E|D|A path. In mode [D], control circuit 114 might cause packet 202 to be selectively sent to both the combined engine on the E|D|A path and on the bypass path to pipeline circuitry 106. The authentication result might be sent on path 124 to pipeline circuitry 106.

FIG. 3 illustrates an example method 300 for low-latency MACsec authentication, according to embodiments of the present disclosure. Method 300 may be performed by any suitable apparatus, such as elements of system 100. In particular, method 300 may be performed by one or more of device 102, circuit 104, control circuit 114, or engine 118. For example, method 300 may be performed by a combination of control circuit 114 and engine 118 to produce a packet, which may then be handled by, for example, pipeline circuitry 106 as illustrated in FIG. 4.

Method 300 may include more or fewer steps than those illustrated in FIG. 3. Various steps of method 300 may be repeated, omitted, performed recursively, or performed in a different order. Method 300 may be initiated upon any suitable criteria, may repeat, and may terminate upon any suitable criteria. Method 300 may begin with any suitable step, such as step 305.

At step 305, a packet may be received. The packet may have been generated by another device or within the device in question.

At step 310, operations to be performed on the packet may be determined. The operations may include, for example, encryption/decryption, or authentication.

At step 315, it may be determined whether encryption or decryption are to be performed. If so, method 300 may proceed to step 320. Otherwise, method 300 may proceed to step 335.

At step 320, decryption or encryption may be performed according to the determinations of step 310. When finished, the resulting packet may be sent to pipeline circuitry. Method 300 may proceed to step 325.

At step 325, it may be determined whether authentication is to be performed on the packet. If not, method 300 may proceed to step 355. If so, method 300 may proceed to step 330. In one embodiment, steps 325-330 may be performed in parallel with performance of encryption or decryption in step 320.

At step 330, the packet may be sent to an authentication engine. Upon completion of authentication, an authentication signal may be sent to the pipeline circuitry. Method 300 may proceed to step 355.

At step 335, it may be determined whether authentication is to be performed on the packet. If not, method 300 may proceed to step 350. If so, method 300 may proceed to step 340.

At step 340, the packet may be sent to pipeline circuitry through a bypass path that bypasses decryption and encryption engines. Furthermore, the bypass path might also bypass the authentication engine. The packet may be sent in parallel to the authentication engine. Method 300 may proceed to step 345.

At step 345, an authentication signal may be sent to the pipeline circuitry when the authentication process has completed. The authentication signal may indicate whether or not the packet was authenticated. Method 300 may proceed to step 355.

At step 350, the packet may be sent to pipeline circuitry through a bypass path that bypasses decryption and encryption engines. Furthermore, the bypass path might also bypass the authentication engine. Method 300 may proceed to step 355.

At step 355, the method may terminate.

FIG. 4 illustrates another example method 400 for low-latency MACsec authentication, according to embodiments of the present disclosure. Method 400 may be performed by any suitable apparatus, such as elements of system 100. In particular, method 400 may be performed by one or more of device 102, circuit 104, or pipeline circuitry 106. For example, method 400 may be performed by pipeline circuitry 106 for a packet generated by, for example, a combination of control circuit 114 and engine 118.

Method 400 may include more or fewer steps than those illustrated in FIG. 4. Various steps of method 400 may be repeated, omitted, performed recursively, or performed in a different order. For example, multiple packets may be processed by method 400 at the same time. Method 400 may be initiated upon any suitable criteria, may repeat, and may terminate upon any suitable criteria. Method 400 may begin with any suitable step, such as step 405.

At step 405, a packet may be received from another part of the device, such as the engine or control circuit. At step 410, processing of the packet may begin.

At step 415, it may be determined whether authentication is required for the received packet. If it is known that authentication is not required, method 400 may proceed to step 445. If it is known that authentication is required, method 400 may proceed to step 430. If it is unknown whether authentication is required, or if authentication is optional, method 400 may proceed to step 420.

At step 420, it may be determined whether an authentication signal has been received. If not, method 400 may proceed to step 425. If so, method 400 may proceed to step 440.

At step 425, it may be determined whether a designated time has expired. The designated time may specify an amount of time to wait since the packet has been received. The designated time may be for an amount of time sufficient that an authentication signal should have been received. The designated time may be a time needed to otherwise process the packet. If the designated time has expired, method 400 may proceed to step 445. Otherwise, method 400 may return to step 420.

At step 430, it may be determined whether an authentication signal has been received. If not, method 400 may proceed to step 435. If so, method 400 may proceed to step 440.

At step 435, it may be determined whether a designated time has expired. The designated time may specify an amount of time to wait since the packet has been received. The designated time may be for an amount of time sufficient that an authentication signal should have been received. The designated time may be a time needed to otherwise process the packet. If the designated time has expired, method 400 may proceed to step 450. Otherwise, method 400 may return to step 430.

At step 440, it may be determined whether a received authentication signal indicates that the packet is authenticated. If the packet is authenticated, method 400 may proceed to step 445. If the packet is not authenticated, method 400 may proceed to step 450.

At step 445, the packet as otherwise processed may be issued as an output packet. Method 400 may proceed to step 455.

At step 450, any suitable corrective action may be taken for the unauthenticated packet. Method 400 may proceed to step 455.

At step 445, method 400 may terminate.

Although example embodiments have been described above, other variations and embodiments may be made from this disclosure without departing from the spirit and scope of these embodiments.

The invention claimed is:

1. An apparatus, comprising:
a pipeline circuit to process packets; and
an authentication engine to authenticate packets and to provide an authentication signal to the pipeline circuit based on whether packets have been authenticated; and
a control circuit to route a given incoming packet to both the authentication engine and to a bypass path, the bypass path to provide a copy of the given incoming packet to the pipeline circuit to bypass the authentication engine;
wherein the pipeline circuit is to:
receive the given incoming packet;
receive the authentication signal for the given incoming packet; and
between receipt of the given incoming packet and the authentication signal for the given incoming packet, process the given incoming packet to generate an output packet;
based upon an indication in the authentication signal that the given incoming packet failed authentication, take a corrective action; and
based upon an indication in the authentication signal that the given incoming packet has been authenticated, issue the output packet.

2. The apparatus of claim 1, comprising an encryption and decryption engine to encrypt or decrypt packets and to provide resultant encrypted or decrypted packets to the pipeline circuit, wherein the control circuit is to route the given incoming packet selectively to either the bypass path or to the encryption and decryption engine.

3. The apparatus of claim 1, comprising an encryption and decryption engine to encrypt or decrypt packets and to provide resultant encrypted or decrypted packets to the pipeline circuit, wherein the control circuit is to selectively route the given incoming packet to the authentication engine and to the bypass path based on a determination that the given incoming packet is to be authenticated but are not to be decrypted.

4. The apparatus of claim 1, comprising an encryption and decryption engine to encrypt or decrypt packets and to provide resultant encrypted or decrypted packets to the pipeline circuit, wherein the control circuit is to selectively route the given incoming packet to the encryption and decryption engine based on a determination that the given incoming packet is to be encrypted or decrypted.

5. The apparatus of claim 1, wherein the control circuit is to route, in parallel, copies of the given incoming packet to the authentication engine and to the pipeline circuit through the bypass path.

6. A method, comprising:
receiving a given incoming packet at an apparatus;
routing the given incoming packet to both a bypass path and an authentication engine of the apparatus;

at the authentication engine, authenticating the given incoming packet and providing an authentication signal to a pipeline circuit based on whether packets have been authenticated;

wherein routing the given incoming packet to the bypass path includes providing a copy of the given incoming packet to the pipeline circuit to bypass the authentication engine; and at the pipeline circuit:
receiving the given incoming packet;
receiving an authentication signal for the given incoming packet from the authentication engine; and
between receipt of the given incoming packet and the authentication signal for the given incoming packet, processing the given incoming packet to generate an output packet;
based upon an indication in the authentication signal that the given incoming packet failed authentication, taking a corrective action; and
based upon an indication in the authentication signal that the given incoming packet has been authenticated, issuing the output packet.

7. The method of claim 6, comprising routing the given incoming packet selectively to either the bypass path or to an encryption and decryption engine of the apparatus.

8. The method of claim 6, comprising selectively routing the given incoming packet to the authentication engine and to the bypass path based on a determination that the given incoming packet is to be authenticated but are not to be decrypted.

9. The method of claim 6, comprising selectively routing the given incoming packet to an encryption and decryption engine of the apparatus based on a determination that the given incoming packet is to be encrypted or decrypted.

10. The method of claim 6, comprising routing, in parallel, copies of the given incoming packet to the authentication engine and to the pipeline circuit through the bypass path.

11. An article of manufacture comprising instructions on a non-transitory machine-readable medium, the instructions, when read and loaded by a processor, cause the processor to:
receive a given incoming packet at an apparatus;
route the given incoming packet to both a bypass path and an authentication engine of the apparatus;

at the authentication engine, authenticate the given incoming packet and providing an authentication signal to a pipeline circuit based on whether packets have been authenticated;

wherein routing the given incoming packet to the bypass path includes providing a copy of the given incoming packet to the pipeline circuit to bypass the authentication engine; and at the pipeline circuit:
receive the given incoming packet;
receive an authentication signal for the given incoming packet from the authentication engine; and
between receipt of the given incoming packet and the authentication signal for the given incoming packet, process the given incoming packet to generate an output packet;
based upon an indication in the authentication signal that the given incoming packet failed authentication, take a corrective action; and
based upon an indication in the authentication signal that the given incoming packet has been authenticated, issue the output packet.

12. The article of claim 11, wherein the instructions are to cause the processor to route the given incoming packet selectively to either the bypass path or to an encryption and decryption engine of the apparatus.

13. The article of claim 11, wherein the instructions are to cause the processor to selectively route the given incoming packet to the authentication engine and to the bypass path based on a determination that the given incoming packet is to be authenticated but are not to be decrypted.

14. The article of claim 11, wherein the instructions are to cause the processor to selectively route the given incoming packet to an encryption and decryption engine of the apparatus based on a determination that the given incoming packet is to be encrypted or decrypted.

15. The article of claim 11, wherein the instructions are to cause the processor to route, in parallel, copies of the given incoming packet to the authentication engine and to the pipeline circuit through the bypass path.

16. The apparatus of claim 1, wherein the output packet is processed based upon a payload of the given incoming packet.

17. The apparatus of claim 16, wherein the output packet includes the payload of the given incoming packet.

* * * * *